United States Patent
Lee

(10) Patent No.: US 8,693,175 B2
(45) Date of Patent: Apr. 8, 2014

(54) COVER LIFTING STRUCTURE AND ELECTRONIC SYSTEM WITH COVER LIFTING STRUCTURE

(75) Inventor: Shin-Min Lee, Taipei (TW)

(73) Assignee: ASUSTeK Computer Inc., Taipei (TW)

(*) Notice: Subject to any disclaimer, the term of this patent is extended or adjusted under 35 U.S.C. 154(b) by 22 days.

(21) Appl. No.: 13/615,634

(22) Filed: Sep. 14, 2012

(65) Prior Publication Data

US 2013/0077216 A1    Mar. 28, 2013

Related U.S. Application Data

(60) Provisional application No. 61/538,108, filed on Sep. 22, 2011.

(51) Int. Cl.
*H05K 5/00* (2006.01)
*H05K 7/00* (2006.01)
*A47B 81/00* (2006.01)
*A47B 96/06* (2006.01)

(52) U.S. Cl.
USPC ............ 361/679.02; 361/679.06; 361/679.07; 361/679.15; 361/679.27; 361/679.28; 312/332.1; 312/223.2; 248/220.41

(58) Field of Classification Search
USPC ............. 361/679.01–679.07, 679.26–679.29, 361/679.4–679.45, 679.57–679.59, 361/679.41–679.44, 726–727, 732, 361/740–747; 312/223.1–223.3; 248/220.31, 220.41
See application file for complete search history.

(56) References Cited

U.S. PATENT DOCUMENTS

| | | | |
|---|---|---|---|
| 6,658,271 B1* | 12/2003 | Wu | 455/573 |
| 7,669,287 B2* | 3/2010 | Lee et al. | 16/340 |
| 2008/0052875 A1* | 3/2008 | Lee et al. | 16/382 |
| 2010/0246119 A1* | 9/2010 | Collopy et al. | 361/679.55 |

FOREIGN PATENT DOCUMENTS

CN    101231537    7/2008

* cited by examiner

*Primary Examiner* — Jenny L Wagner
*Assistant Examiner* — Jerry Wu
(74) *Attorney, Agent, or Firm* — Jianq Chyun IP Office

(57) ABSTRACT

A cover lifting structure is suitable for a body of an electronic device. The body has a recess. The cover lifting structure includes a first rotating member, a second rotating member, an elastic member and a pushing member. The first rotating member pivoted to the body with a first axis. The second rotating member pivoted to the first rotating member with a second axis. The elastic member is propped against the first and the second rotating members. The first rotating member closes the recess, and the second rotating member contacts against the pushing member in a first state. The first rotating member opens the recess, and the second rotating member moves away from the pushing member in a second state. In a third state, the first rotating member closes the recess, and the second rotating member falls behind a stroke to the first rotating member.

14 Claims, 9 Drawing Sheets

COVER LIFTING STRUCTURE AND ELECTRONIC SYSTEM WITH COVER LIFTING STRUCTURE

CROSS-REFERENCE TO RELATED APPLICATION

This application claims the priority benefits of U.S. provisional application Ser. No. 61/538,108, filed on Sep. 22, 2011. The entirety of the above-mentioned patent application is hereby incorporated by reference herein and made a part of this specification.

FIELD OF THE INVENTION

The disclosure relates to an electronic system, and more particularly, an electronic system with a cover lifting structure that accommodates and assembles an electronic device into another electronic device.

DESCRIPTION OF RELATED ART

With the developments of technology and living styles, a variety of portable electronic devices which are compact and readily used have also flourished. Notebook computers and cellular phones are widely adopted. However, functions of these two portable electronic devices obviously are distinguishable. A main function provided by a cellular phone is for communication, while functions in respect to a notebook computer are much similar to the ones provided by a desktop computer and therefore provides broader range of applications.

Accordingly, a user going outdoors carries both portable electronic devices, that is, functions of these two portable electronic devices cannot be shared with each other. A user trying to interchange information stored in these two portable electronic devices has to connect both devices via wireless or wired devices so as to achieve the needed effects.

SUMMARY OF THE INVENTION

The disclosure provides a cover lifting structure having a semiautomatic opening and closing structure.

The disclosure provides an electronic system accommodating and assembling an electronic device into another electronic device via the cover lifting structure.

The cover lifting structure of the disclosure is suitable for an electronic device. The electronic device has a body. The body has a recess. The cover lifting structure includes a first rotating member, a second rotating member, an elastic member and a pushing member. The first rotating member is pivoted to the body with a first axis so as to rotate relative to the body for opening or closing the recess. The second rotating member is pivoted to the first rotating member and rotates relative to the first rotating member about a second axis. The first axis is parallel to the second axis. The elastic member is assembled to the first rotating member and propped against the second rotating member and the first rotating member. When the second rotating member rotates relative to the first rotating member, the second rotating member deforms the elastic member. The pushing member is movably disposed inside the body and located at a rotation path of the second rotating member. In a first state, the first rotating member rotates about the first axis along a first direction to close the recess, the second rotating member is contacted against the pushing member. In a second state, the first rotating member opens the recess and the second rotating member moves away from the pushing member. In the third state, the first rotating member rotates along a first direction about the first axis to close the recess and the second rotating member falls behind a stroke to the first rotating member and deforms the elastic member. The elastic member rotates the second rotating member with the stroke about a second axis by the restoring force, such that the second rotating member is transformed from the third state to the first state.

One embodiment of the disclosure provides an electronic system including a first electronic device and a second electronic device. The first electronic device has a body, a recess disposed on the body and a cover lifting structure. The cover lifting structure includes a first rotating member, a second rotating member, an elastic member and a pushing member. The first rotating member is pivoted to the body with a first axis so as to rotate relative to the body for opening or closing the recess. The second rotating member is pivoted to the first rotating member and rotates about a second axis relative to the first rotating member. The first axis is parallel to the second axis. The elastic member is assembled to the first rotating member and propped against the second rotating member and the first rotating member. When the second rotating member rotates relative to the first rotating member, the second rotating member deforms the elastic member. The pushing member is movably disposed inside the body and located at a rotation path of the second rotating member. The second electronic device is detachably assembled inside the recess and electronically connected to the first electronic device. In a first state, the first rotating member rotates about the first axis along a first direction to close the recess, the second rotating member is contacted against the pushing member. In a second state, the first rotating member opens the recess and the second rotating member moves away from the pushing member. In the third state, the first rotating member rotates along a first direction about the first axis to close the recess and the second rotating member falls behind a stroke to the first rotating member and deforms the elastic member. The elastic member rotates the second rotating member with the stroke about a second axis by the restoring force, such that the second rotating member is transformed from the third state to the first state.

In light of the foregoing, in the aforementioned embodiments of the disclosure, the first electronic device accommodates the second electronic device in the recess and a combined electronic system can have functions of both the first electronic device and the second electronic device at the same time. Furthermore, with the dispositions of members such as the driving arm of the cover lifting structure and the second rotating member, etc., the second rotating member not only can rotate by surrounding the first axis but also rotate about the second axis such that the cover lifting structure, after being opened, has the structure and functions of returning back to the original position automatically. Such a process provides effort-saving effects in terms of combining and detaching the first electronic device and the second electronic device, and minimizes repetitive processes of combination and detachment for the electronic system.

In order to make the aforementioned features and advantages of the disclosure more comprehensible, embodiments accompanied with figures are described in detail below.

DESCRIPTION OF EMBODIMENTS

Figure 1:
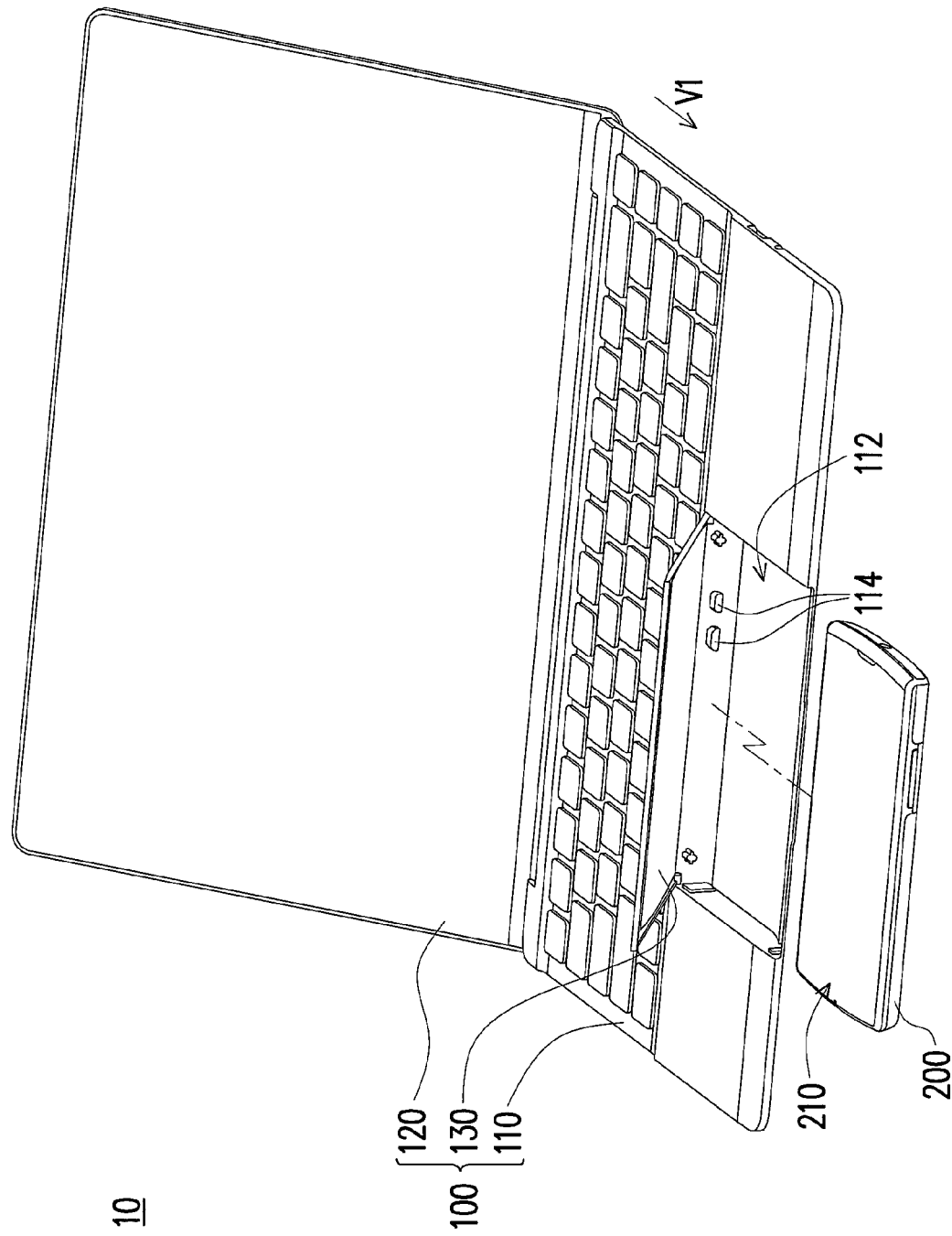
FIG. 1 is a schematic view of an electronic device according to an embodiment.

FIG. 1 is a schematic view of an electronic system according to the disclosure. Referring to FIG. 1. An electronic system 10 includes a first electronic device 100 and a second electronic device 200, wherein the first electronic device 100 is, for example, a notebook computer including a first body 110 (for example, a host), a second body 120 (for example, a display) and a cover lifting structure 130. Furthermore, the first body 110 has a recess 112 that the cover lifting structure 130 opens or closes the recess 112 with a rotation relative to the first body 110.

In the present embodiment, when the recess 112 is opened by the cover lifting structure 130, a user can assemble the second electron device 200 into the recess 112, and after the second electronic device 200 is assembled or removed, the cover lifting structure 130 can close the recess 112 again. In addition, when the second electronic device 200 is assembled inside the recess 112, the second electronic device 200 is electrically connected with the first electronic device 100 via a connector 114 located inside the recess 112 such that signals are transferred between the first electronic device 100 and the second electronic device 200.

Accordingly, the first electronic device 100 and the second electronic device 200 can share resources and functions with each other, and furthermore, effects of one electronic device operating another electronic device can be achieved by switching systems. For example, the second electronic device 200 has a touch screen 210 and the cover lifting structure 130 is a plate with touch-control functions. Therefore, after the second electronic device 200 is assembled inside the recess 112, the cover lifting structure 130 can be used as a touch-pad of the first electronic device 100 so as to operate and control the first electronic device 100. However, the present embodiment is not limited thereto. Any of two of electronic devices with different functions that are suitable for combining together can be used in the present disclosure.

Figure 2:
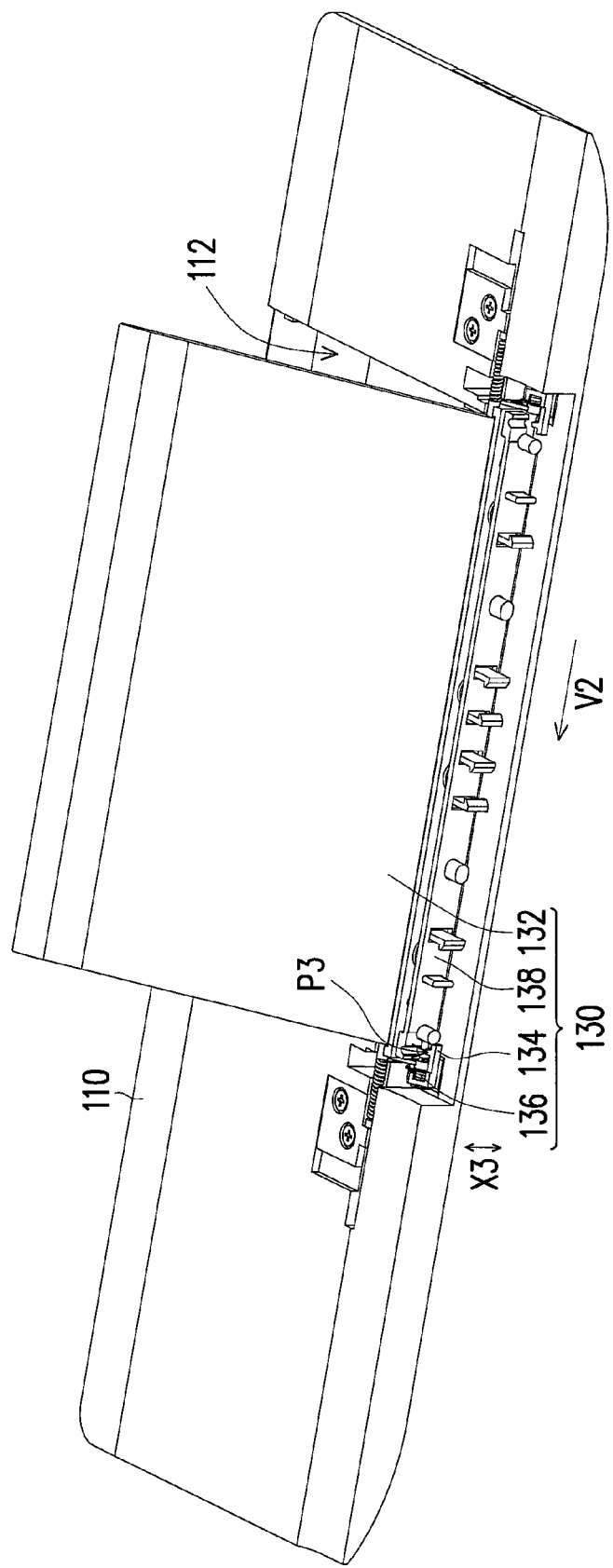
FIG. 2 is a schematic view illustrating some components of the electronic device from a viewing angle V1 of FIG. 1.
Figure 3:
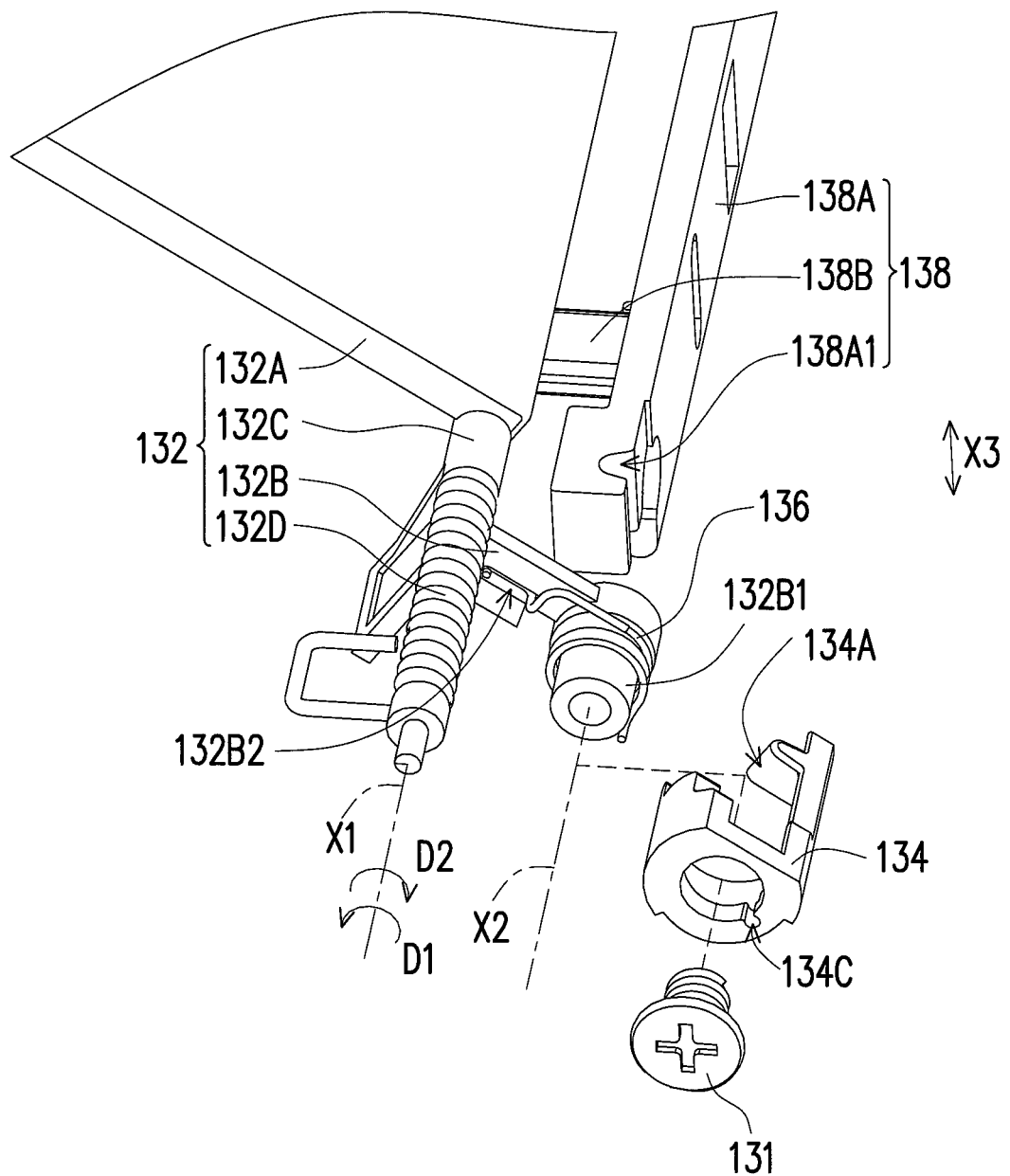
FIG. 3 is an exploded view of some components in a cover lifting structure of FIG. 2.

FIG. 2 is a schematic view illustrating some components of the electronic device from a viewing angle V1 of FIG. 1. FIG. 3 is an exploded view of some components in the cover lifting structure of FIG. 2, wherein FIG. 3 is illustrated from a left viewing angle of FIG. 2. Referring to FIG. 1 to FIG. 3. Herewith, to smoothly remove and install the second electronic device 200 from/in the recess 112 of the first electronic device 100, the cover lifting structure 130 of the first electronic device 100 includes a first rotating member 132, a second rotating member 134, a first elastic member 136 and a pushing member 138.

The first rotating member 132 is pivoted to the first body 110 with a first axis X1 and has a cover 132A and a driving arm 132B. It should be noted that the second rotating member 134 and the first elastic member 136 are disposed symmetrically on two opposite ends of the cover 132A (also located at two opposite ends of the pushing member 138 at the same time). Therefore, one end is taken below as description.

More specifically, the first rotating member 132 has a rotation axis 132C along the first axis X1 and is pivoted to the first body 110, wherein the cover 132A and the driving arm 132B extend radially with respect to the rotation axis 132C as a rotating center, and the rotation axis 132C, the cover 132A and the driving arm 132B are an integral structure; that is, the cover 132A and the driving arm 132B extend respectively from the first axis X1 but departs from the first axis X1. Therefore, when the first rotating member 132 rotates relative to the first body 110, the cover 132A can open or close the recess 112 consequently; that is, when a user pushes the cover 132A, the driving arm 132B also rotates relative to the first axis X1 with the cover 132A.

The second rotating member 134 is pivoted to an end of the driving arm 132B and rotates relative to the driving arm 132B about a second axis X2, wherein the first axis X1 is parallel to the second axis X2. Specifically, the driving arm 132B has a protruding axle 132B1 extending along the second axis X2 and the second rotating member 134 is pivoted on the protruding axle 132B1 and locked to the protruding axle 132B1 by a screwing component 131, and the protruding axle 132B1 and the second rotating member 134 are pivoted such that the second rotating member 134 is rotated freely about the second axis X2 (that is, the protruding axle 132B1 of the driving arm 132B).

In addition, the first elastic member 136 assembled to the driving arm 132B is propped against and between the second rotating member 134 and the driving arm 132B. In the present embodiment, the first elastic element 136 is a torsion spring pivoted on the protruding axle 132B1. One end of the first elastic member 136 is wedged in a groove 134C of the second rotating member 134, and the other end extends toward the first axis X1 and is wedged in a groove 132B2 of the driving arm 132B. Accordingly, since the first elastic member 136 is connected between the second rotating member 134 (can be seen as a motion member) and the driving arm 132B (can be seen as a stationary member), when the second rotating member 134 is rotated relative to the driving arm 132B, the second rotating member 134 deforms the first elastic member 136.

Figure 4:
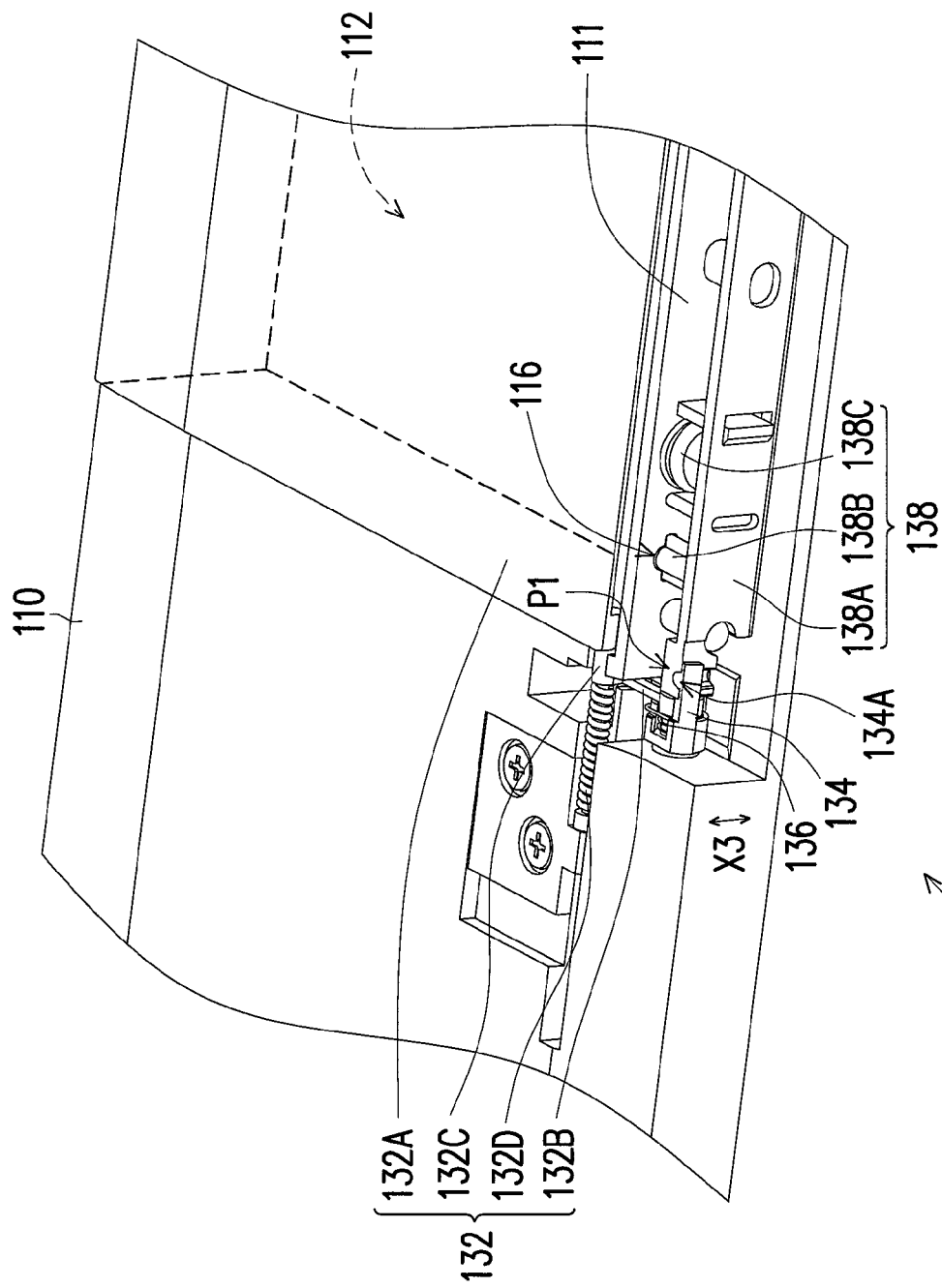
FIG. 4 and FIG. 5 are schematic views illustrating respectively the cover lifting structure in other states.
Figure 5:
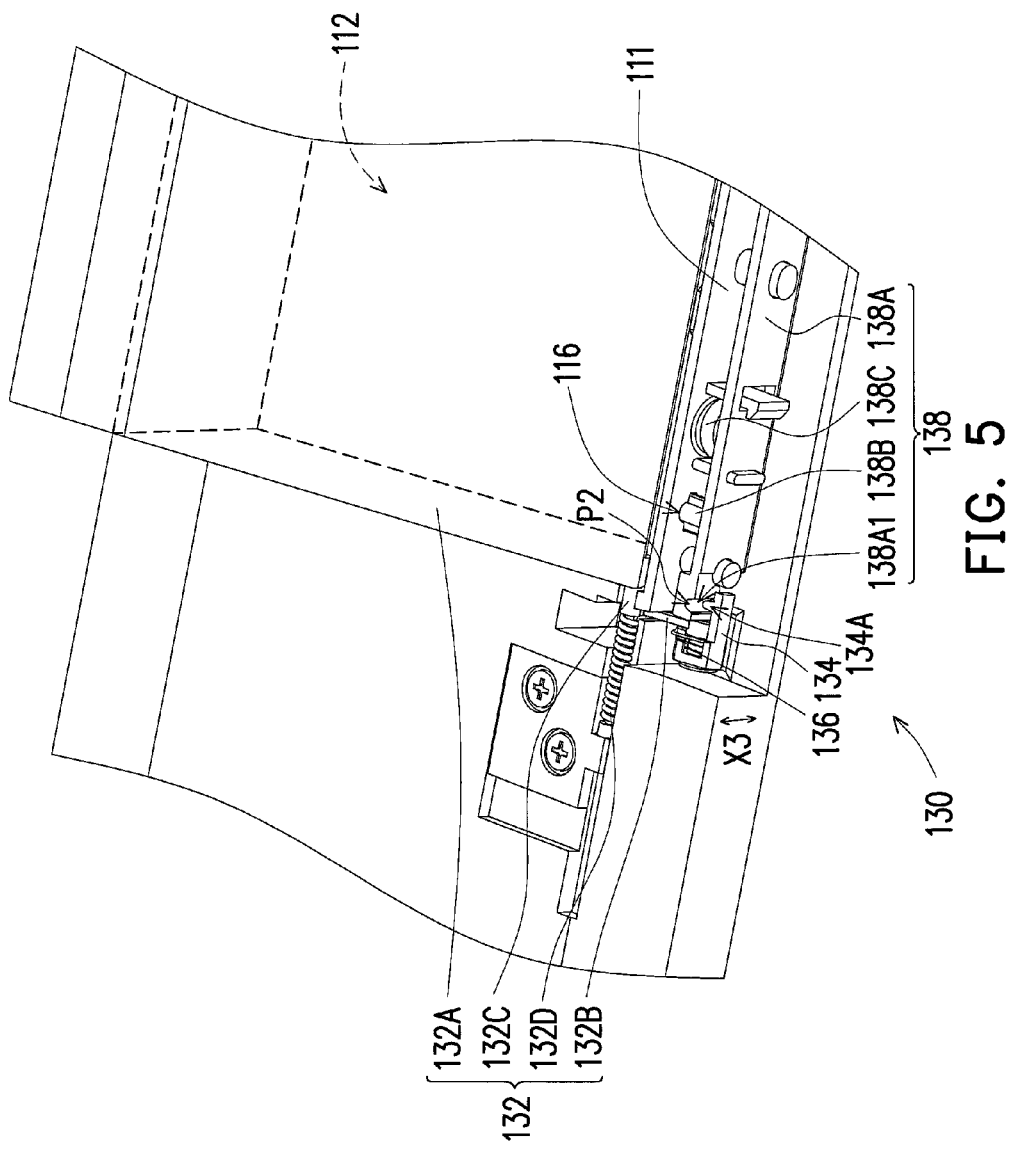
Figure 6:
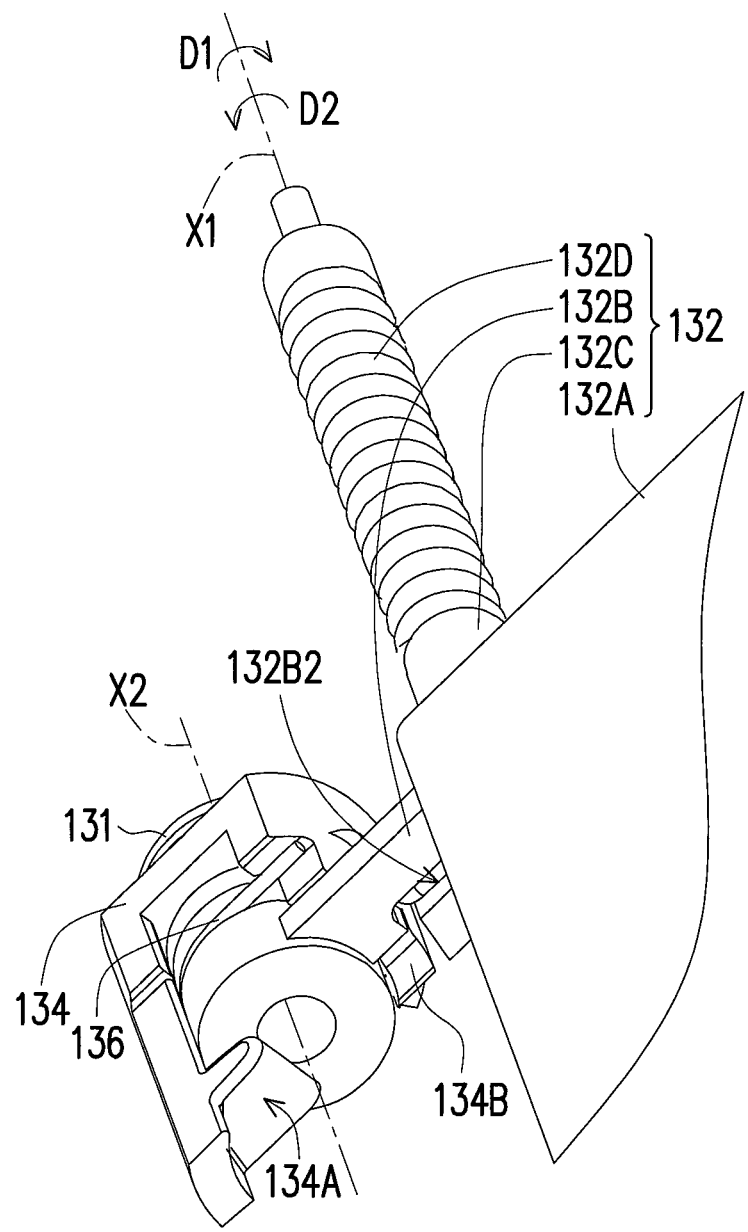
FIG. 6 is a partial enlarged view of the cover lifting structure from a viewing angle V2 of FIG. 2.

FIG. 4 and FIG. 5 are schematic views illustrating respectively the cover lifting structure in other states, wherein FIG. 4 illustrates a closed state of the cover lifting structure relative to the body. FIG. 5 illustrates a process of a transitional state of the cover lifting structure conversing from a closed state of FIG. 4 to an opened state of FIG. 2. FIG. 6 is a partial enlarged view of the cover lifting structure from a viewing angle V2 of FIG. 2. Referring to FIG. 3 to FIG. 6. In the present embodiment, in a process of opening the cover 132A, the cover 132A rotates about the first axis X1 and the driving arm 132B also rotates about the first axis X1. It should be noted that, as shown in FIG. 6, the second rotating member 134 has a stopping portion 134B. When the second rotating member 134 is assembled to the protruding axle 132B1, the stopping portion 134B located at one side of the driving arm 132B interferes with a lower edge of the driving arm 132B. Accordingly, when the driving arm 132B rotates along a second direction D2 about the first axis X1, the driving arm 132B and the stopping portion 134B interfere with each other and the second rotating member 134 is driven synchronously such that the second rotating member 134 rotates along the second direction D2 about the first axis X1, that is, the second rotating member 134 rotates about the first axis X1. In other words, such action described above prevents the second rotating member 134 from rotating relative to the driving arm 132B when the driving arm 132B rotates along the second direction D2.

Figure 7:
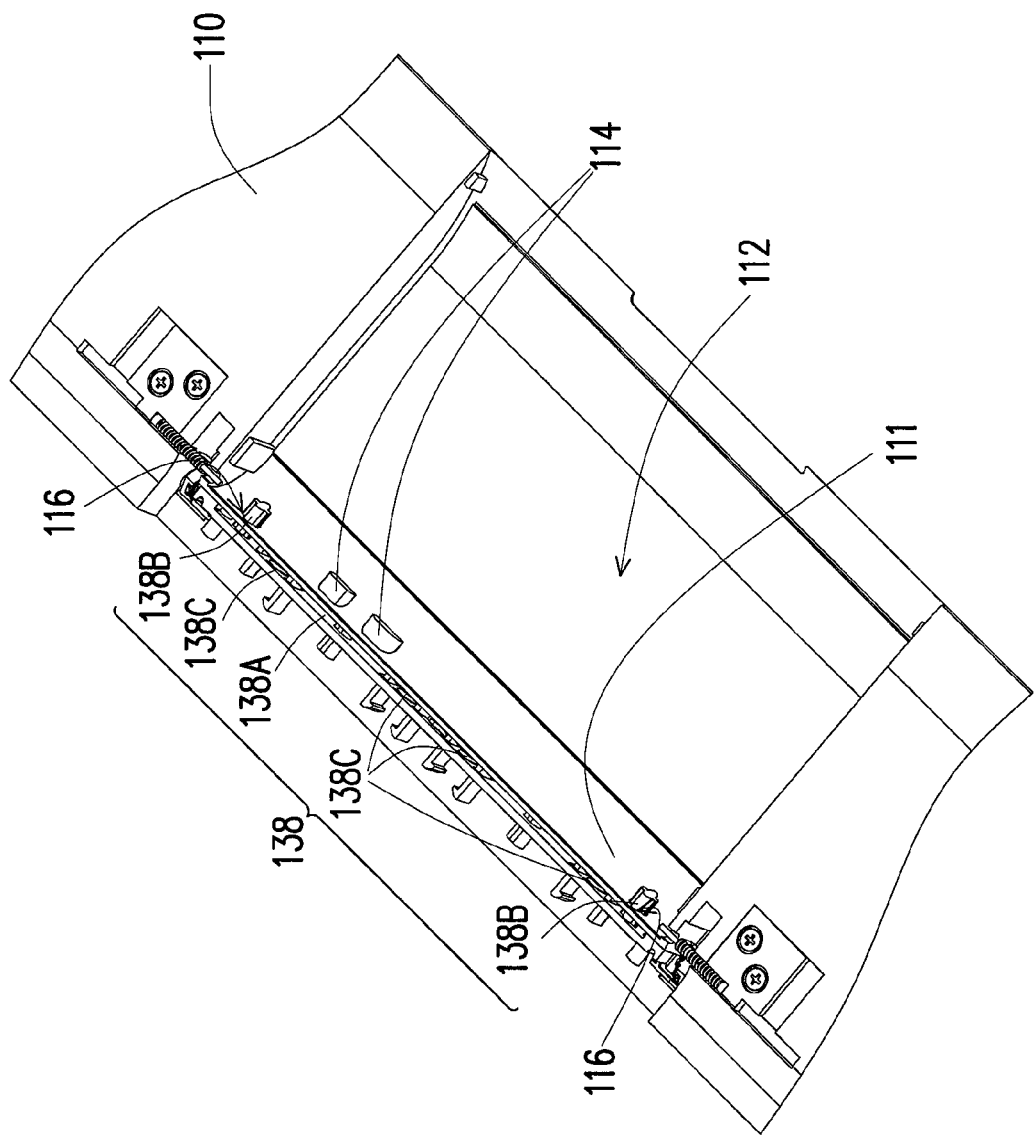
FIG. 7 is a schematic view illustrating some components of the cover lifting structure in the state as shown in FIG. 5 from another viewing angle.

FIG. 7 is a schematic view illustrating some components of the cover lifting structure in a state as shown in FIG. 5 from another viewing angle, wherein the cover 132A is omitted so as to clearly identify a motion state of the pushing member 138. Referring to FIG. 5 and FIG. 7 together. The pushing member 138 is movably disposed inside the first body 110 and located at a rotating path of the second rotating member 134. The pushing member 138 includes a plate 138A and pushing portions 138B located at two opposite ends of the plate 138A. Referring to FIG. 3, FIG. 5 and FIG. 7 again. The plate 138A has a ditch groove 138A1. A protruding portion 134A of the second rotating member 134 is movably contacted against an inside of the ditch groove 138A1. The pushing portions 138B extend from the plate 138A to the recess 112. On the other hand, the first body 110 has an aperture 116 and a side wall 111 spacing the recess 112 and other regions apart, wherein the aperture 116 is located on the side wall 111, and the corresponding pushing portion 138B passes through the aperture 116. Accordingly, when the second rotating member 134 rotates about the first axis X1 or rotates about the second axis X2, the protruding portion 134A pushes and moves the plate 138A.

On the other hand, when the cover 132A is opened, the protruding portion 134A moves inside the ditch groove 138A1 and pushes the plate 138A of the pushing member 138, and the pushing portions 138B passes through the apertures 116 and protrude into the recess 112, such that the second electronic device 200(marked in FIG. 1) disposed inside the recess 112 is pushed out of the recess 112, and it's convenient to a user to take the second electronic device 200 away from the first electronic device 100.

Referring to FIG. 3, FIG. 4 and FIG. 5. More specifically, when the driving arm 132B rotates along the second direction D2 about the first axis X1, the second rotating member 134 revolves around the first axis X1 following the driving arms 132B, such that the protruding portion 134A, inside the ditch groove 138A1, of the cover lifting structure 130 in a first state (that is, the state that the cover 132A of the first rotating member 132 closes the recess 112 and the second rotating member 134 is contacted against the pushing member 138) moves from a first position P1 (as shown in FIG. 4) to a second position P2 (as shown in FIG. 5). Due to that an extending axis X3 of the ditch groove 138A1 has a longitudinal straight-lined contours, the extending axis X3 interferes with a rotation path caused by the protruding portion 134A along the second direction D2. Accordingly, the plate 138A is pushed by the protruding portion 134A and moves toward the side wall 111 such that the pushing portion 138B passes through the aperture 116 and protrudes into the recess 112.

Next, referring to FIG. 2, FIG. 4 and FIG. 5 again. When the protruding portion 134A rotates along the second direction D2 about the first axis X1 and moves from the second position P2 to a third position P3 (wherein the third position is as shown in FIG. 2 and the second position P2 is located between the first position P1 and the third position P3), the protruding portion 134A moves out of the ditch groove 138A1, that is, at this time, the cover lifting structure 130 is at the second state where the cover 132A of the first rotating member 132 opens the recess 112 and the second rotating member 134 moves out of the pushing member 138.

Furthermore, the pushing member 138 of the present embodiment further includes a plurality of the second elastic members 138C disposed inside the first body 110 and are propped against between the plate 138A and the side wall 111 of the first body 110. As described hereinbefore, in a process of opening the cover 132A, the plate 138A moves toward the side wall 111 and deforms the second elastic member 138C. On the contrary, if the cover 132A is not receiving any external force, elastic restoring force of the second elastic member 138C pushes and moves the plate 138A away from the side wall 111, and moves the pushing portion 138B out of the recess 112 through the aperture 116 and moves the plate 138A back to its original location, and the plate 138A is back to the rotation path of the protruding portion 134A.

In the present embodiment, the first rotating member 132 further includes a third elastic member 132D disposed on the shaft 132C and is propped against the first body 110 and the shaft 132C. When the cover 132A is opened as shown in FIG. 4, FIG. 5 and FIG. 2 sequentially (also refer to FIG. 3), due to that the shaft 132C rotates about the first axis X1 deforms the third elastic member 132D and therefore when a user stops using forces to open the cover 132A, the cover 132A and the driving arm 132B rotate along a first direction D1 about the first axis X1 via elastic restoring force of the third elastic member 132D, such that the cover 132A closes the recess 112 again, wherein the first direction D1 is opposite to the second direction D2.

Figure 8:
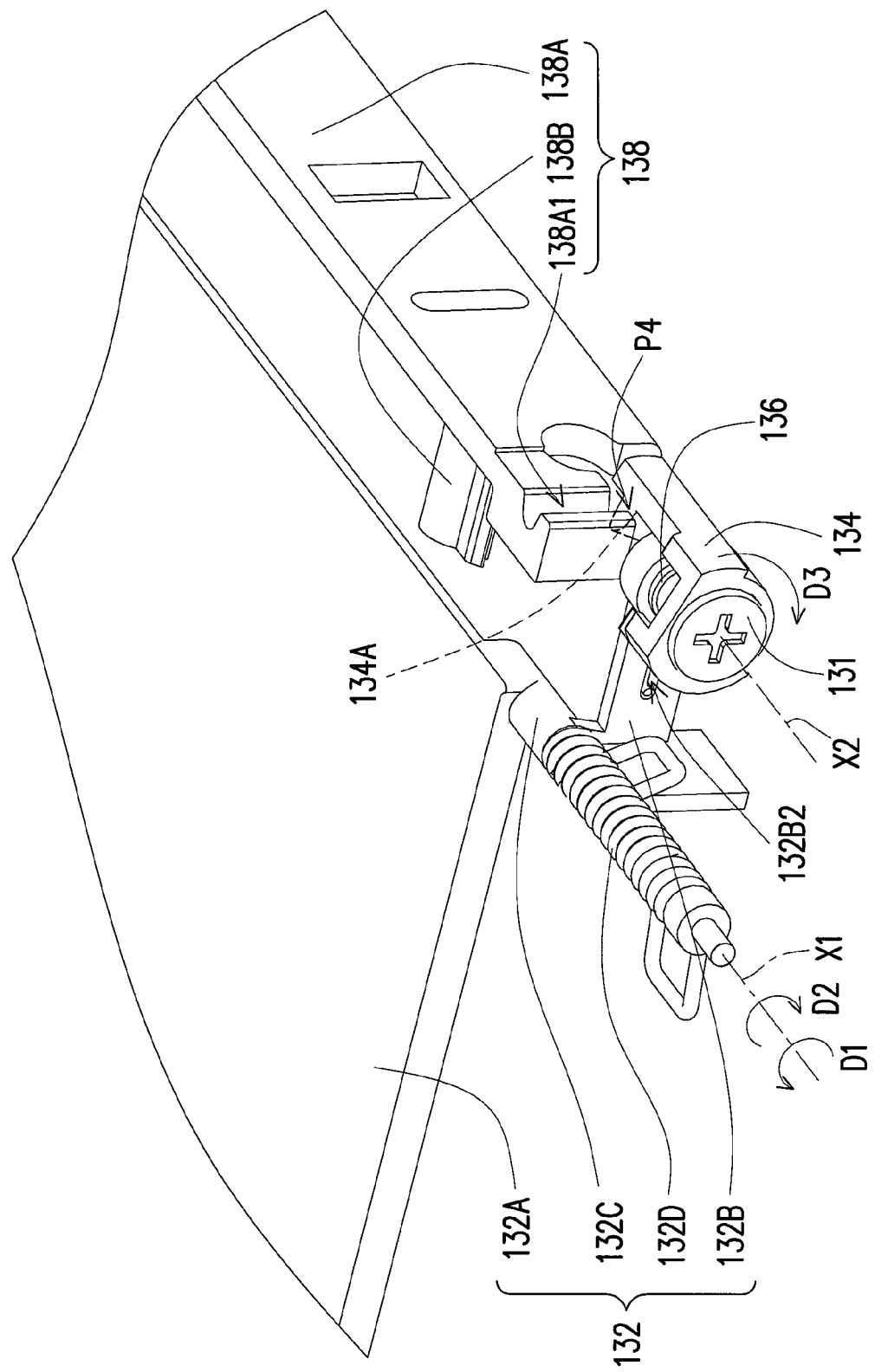
FIG. 8 is a schematic view of a second rotating member relative to a pushing member in a third state.
Figure 9:
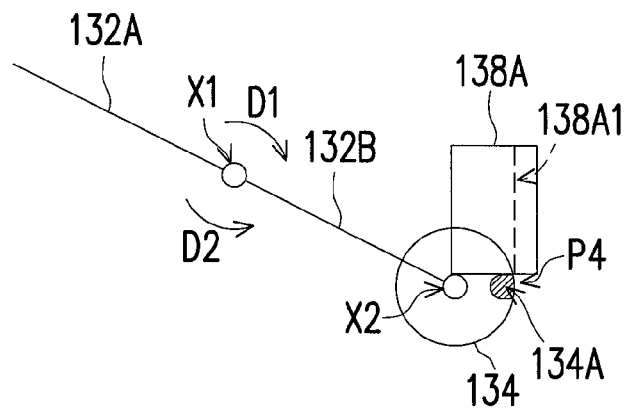
FIG. 9 to FIG. 11 are equivalent schematic views illustrating respectively the cover lifting structure in different states.
Figure 10:
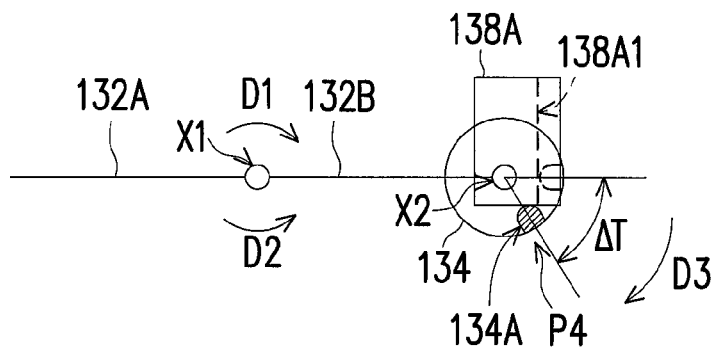
Figure 11:
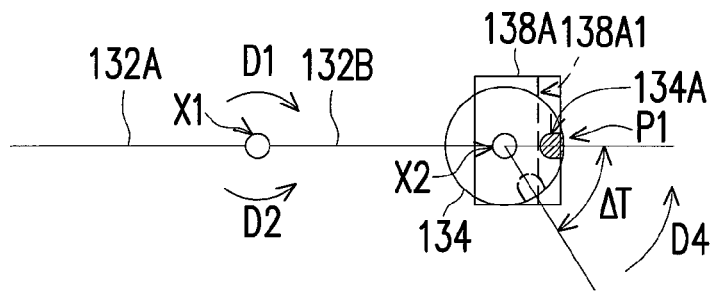

FIG. 8 is a schematic view of a second rotating member relative to a pushing member in a third state. FIG. 9 to FIG. 11 are equivalent schematic views illustrating the cover lifting structure in different states, respectively, and describing a resetting process of the cover lifting structure, wherein a state illustrated in FIG. 8 is equivalent to a state illustrated in FIG. 9.

Referring to FIG. 8 and FIG. 11 together. Based on the above, in the third state, the cover 132A of the first rotating member 132 closes the recess 112, that is, when the driving arm 132B drives the second rotating member 134 to rotate about along the first direction D1 and about the first axis X1, the plate 138A returns to the original position by the second elastic member 138C. Herewith, the plate 138A is located on the rotation path of the protruding portion 134A along the first direction D1, causing the protruding portion 134A interfering with the lower edge of the plate 138A, and the protruding portion 134A staying temporarily at a fourth position P4, wherein the fourth position P4 is located between the second position P2 and the third position P3.

However, at this time, the second rotating member 134 does not have any structure that can stop the driving arm 132B from rotating toward the first direction D1 (referring to FIG. 6, wherein the aforementioned describes that the stopping portion 134B of the second rotating member 134 is located at one side of the driving arm 132B and interferes with the driving arm 132B when the driving arm 132B rotates toward the second direction D2. Meanwhile, there is no structure that interferes with the other side of the driving arm 132B). Accordingly, the driving arm 132B still maintains its movement pattern and rotates continuously toward the first direction D1 and finally returns to the original position where the cover 132A closes the recess 112 (as shown in FIG. 10). Relatively, the second rotating member 134, blocked by the plate 138A and rotates relatives to the end of the driving arm 132B (that is, the second axis X2) along a third direction D3, such that a connecting line from the driving arm 132B, the second axis X2 to the protruding portion 134A is formed as a bending line. In other words, the second rotating member 134 rotates about the second axis X2 and causes that the protruding portion 134A falls behind a rotation stroke ΔT of the driving arm 132B in the first direction D1.

It should be noted that the first elastic member 136 are deformed when a relative rotation occurs between the driving arm 132B and the second rotating member 134. Therefore, in the state illustrated in FIG. 10, the first elastic member 136 is bended consequently and elastic force is stored. Next, in a state that the driving arm 132B returns to the original position, the first elastic member 136 drives the second rotating member 134 to rotate about the second axis X2 along a fourth direction D4 by the elastic restoring force of the first elastic member 136, wherein the fourth direction D4 is opposite to the third direction D3 (the processes as illustrated from FIG. 10 to FIG. 11). As a result, the protruding portion 134A catches up with the rotation stroke ΔT of the driving arm 132B because the second rotating member 134 rotates about the second axis X2. In other words, herewith, the protruding portion 134A driven by the first elastic member 136 suppresses the plate 138A of the pushing member 138 again and is contacted against the pushing member 138, that is, the protruding portion 134A returns to the state consequently as illustrated in FIG. 4. Accordingly, a process of the cover lifting structure 130 changing from opening to closing is completed.

In light of the above, by mounting the second electronic device in the recess of the first electronic device, a combined electronic system has functions of both the first electronic device and the second electronic device that can be used at the same time. Furthermore, the second rotating member of the cover lifting structure is connected freely and pivotally to the end of the driving arm of the first rotating member and therefore, when the protruding portion of the second rotating member stops the pushing member, the second rotating member relative to the first rotating member consequently rotates a stroke, and then drive the second rotating member to rotate via the first elastic member so as to catch up with the stroke and return to the original position. As a result, the cover lifting structure, after being opened, can have the structure and functions of returning to the original position automatically. Such a process provides effort-saving effects in terms of combining and detaching the first electronic device and the second electronic device, and minimizes repetitive processes of combining and detaching for the electronic system.

Although the disclosure has been described with reference to the above embodiments, they are not used to limit the disclosure herein. It will be apparent to one of the ordinary skill in the art that modifications and variations to the described embodiments may be made without departing from the spirit and scope of the disclosure. Accordingly, the scope of the disclosure will be defined by the attached claims not by the above detailed descriptions.

What is claimed is:

1. A cover lifting structure suitable for an electronic device, wherein the electronic device has a body, the body has a recess, and the cover lifting structure comprises:
    a first rotating member pivoted to the body with a first axis;
    a second rotating member pivoted to the first rotating member and rotating relative to the first rotating member about a second axis, wherein the first axis is parallel to the second axis;
    a first elastic member assembled to the first rotating member and propped against the second rotating member and the first rotating member; and
    a pushing member movably disposed inside the body and located at a motion path of the second rotating member, wherein, in a first state, the first rotating member closes a cover and the second rotating member is contacted against the pushing member, in a second state, the first rotating member opens the cover and the second rotating member moves away from the pushing member, and in a third state, the first rotating member rotates along a first direction about the first axis to close the cover and the second rotating member falls behind a stroke to the first rotating member and deforms the first elastic member, wherein the first elastic member rotates the second rotating member with the stroke about the second axis by the restoring force, such that the second rotating member is transformed from the third state to the first state.

2. The cover lifting structure as recited in claim 1, wherein the first rotating member has a cover and a driving arm rotating synchronously and extending radially with respect to the first axis as a rotating center respectively, the cover opens or closes the recess, the second rotating member is pivoted to an end of the driving arm and rotates relative to the driving arm, and the first elastic member is assembled to the driving arm and propped against the second rotating member and the driving arm.

3. The cover lifting structure as recited in claim 2, wherein the second rotating member has a stopping portion located on one side of the driving arm, the stopping portion is located at the rotation path of the driving arm relative to the first axis about a second direction, and the first direction is opposite to the second direction.

4. The cover lifting structure as recited in claim 3, wherein the pushing member comprises:
    a plate having a ditch groove, wherein a protruding portion of the second rotating member can movably be contacted against the ditch groove; and
    at least a pushing portion extending from the plate toward the recess, wherein, in the first state, the protruding portion is located at a first position inside the ditch groove, in the second state, the protruding portion moves away from the ditch groove and is located at a third position, and the protruding portion moves from the first position to a second position inside the ditch groove so as to move the plate and drive the pushing portion to protrude into the recess, and the second position is located between the first position and the third position.

5. The cover lifting structure as recited in claim 4, wherein the pushing member further comprises:
    at least one second elastic member disposed inside the body and propped against the plate and the body, wherein, when the protruding portion is at the second position, the plate deforms the second elastic member, when the protruding portion is located at the third position, the plate does not deform the second elastic member.

6. The cover lifting structure as recited in claim 4, wherein the protruding portion, in the third state, is stopped at a lower edge of the plate and stays at a fourth position, wherein the fourth position is located between the second position and the third position.

7. The cover lifting structure as recited in claim 2, wherein the first rotating member further has a shaft and a third elastic member, wherein the shaft is disposed along the first axis, the cover and the driving arm are integral to the shaft and extended therefrom, the third elastic member is disposed on the shaft and is propped against the body and the shaft.

8. An electronic system comprising:
    a first electronic device having a body, a recess disposed on the body and a cover lifting structure, wherein the cover lifting structure comprises:
        a first rotating member pivoted to the body with a first axis;
        a second rotating member pivoted to the first rotating member and rotating relative to the first rotating member about a second axis, wherein the first axis is parallel to the second axis;

a first elastic member assembled to the first rotating member and propped against the second rotating member and the first rotating member;

a pushing member movably disposed inside the body and located at a motion path of the second rotating member; and a second electronic device detachably assembled inside the recess and electronically connected to the first electronic device;

wherein, in a first state, the first rotating member closes the cover and the second rotating member is contacted against the pushing member, in a second state, the first rotating member opens the cover and the second rotating member moves away from the pushing member, and in a third state, the first rotating member rotates along a first direction about the first axis to close the cover and the second rotating member falls behind a stroke to the first rotating member and deforms the first elastic member, wherein the first elastic member rotates the second rotating member with the stroke about the second axis by the restoring force, such that the second rotating member is transformed from the third state to the first state.

9. The electronic system as recited in claim 8, wherein the first rotating member has a cover and a driving arm rotating synchronously and extending radially with respect to the first axis as a rotation center respectively, the cover opens or closes the recess, the second rotating member is pivoted to an end of the driving arm and rotates relative to the driving arm, and the first elastic member is assembled to the driving arm and propped against the second rotating member and the driving arm.

10. The electronic system as recited in claim 9, wherein the second rotating member has a stopping portion located at one side of the driving arm, and the stopping portion is located at the rotation path of the driving arm relative to the first axis about a second direction, wherein the first direction is opposite to the second direction.

11. The electronic system as recited in claim 10, wherein the pushing member comprises:

a plate having a ditch groove, wherein a protruding portion of the second rotating member can movably be contacted against the ditch groove; and at least a pushing portion extending from the plate toward the recess, wherein, in the first state, the protruding portion is located at a first position inside the ditch groove, in the second state, the protruding portion moves away from the ditch groove and is located at a third position, and the protruding portion moves from the first position to a second position inside the ditch groove so as to move the plate and drive the pushing portion to protrude into the recess, and the second position is located between the first position and the third position.

12. The electronic system as recited in claim 11, wherein the pushing member further comprises:

at least one second elastic member disposed inside the body and propped against the plate and the body, wherein, when the protruding portion is at the second position, the plate deforms the second elastic member, and when the protruding portion is located at the third position, the plate does not deform the second elastic member.

13. The electronic device as recited in claim 11, wherein, in the third state, the protruding portion is stopped at a lower edge of the plate and stays at a fourth position, wherein the fourth position is located between the second position and the third position.

14. The electronic system as recited in claim 9, wherein the first rotating member further has a shaft and a third elastic member, wherein the shaft is disposed along the first axis, the cover and the driving arm are integral to the shaft and extended therefrom, and the third elastic member is disposed on the shaft and is propped against the body and the shaft.

* * * * *